May 5, 1936.　　　C. W. STEVENS　　　2,039,748

HANGER STRUCTURE FOR METERS

Filed March 19, 1930

Inventor
CHARLES W. STEVENS
By　*Sincerl Sincerl*
　　　his Attorneys

Patented May 5, 1936

2,039,748

UNITED STATES PATENT OFFICE 2,039,748

HANGER STRUCTURE FOR METERS

Charles W. Stevens, Columbus, Ohio, assignor to The Lattimer-Stevens Company, Columbus, Ohio, a corporation of Ohio Application March 19, 1930, Serial No. 437,287

7 Claims. (Cl. 285—3)

Gas meters are often made of sheet metal soldered together by hand and as a consequence are not uniform in size and relative arrangement of their members. The terminals of the inlet and outlet pipes are not uniformly in line and do not always lie in the same plane. Indeed it has been said that no two meters are exactly alike. Moreover the terminals of the service and house pipes are rarely left properly spaced, hence to connect the meter with the service and house pipes is troublesome; and the meters or pipes are often left in a strained condition resulting sometimes in a rupturing of the meter. A variety of means for meeting these conditions have been proposed or patented but many of such means have been more or less complicated, involving many parts and much care and time in application and adjustment.

The principal object of the present invention is an improved and simplified means adapted to meet the conditions referred to in a very simple and inexpensive form, and of easy and quick application and adjustment. Particular objects will appear from the disclosure.

The present invention is embodied in the example herein shown and described, the features of novelty being finally claimed.

In the accompanying drawing—

Figure 1:
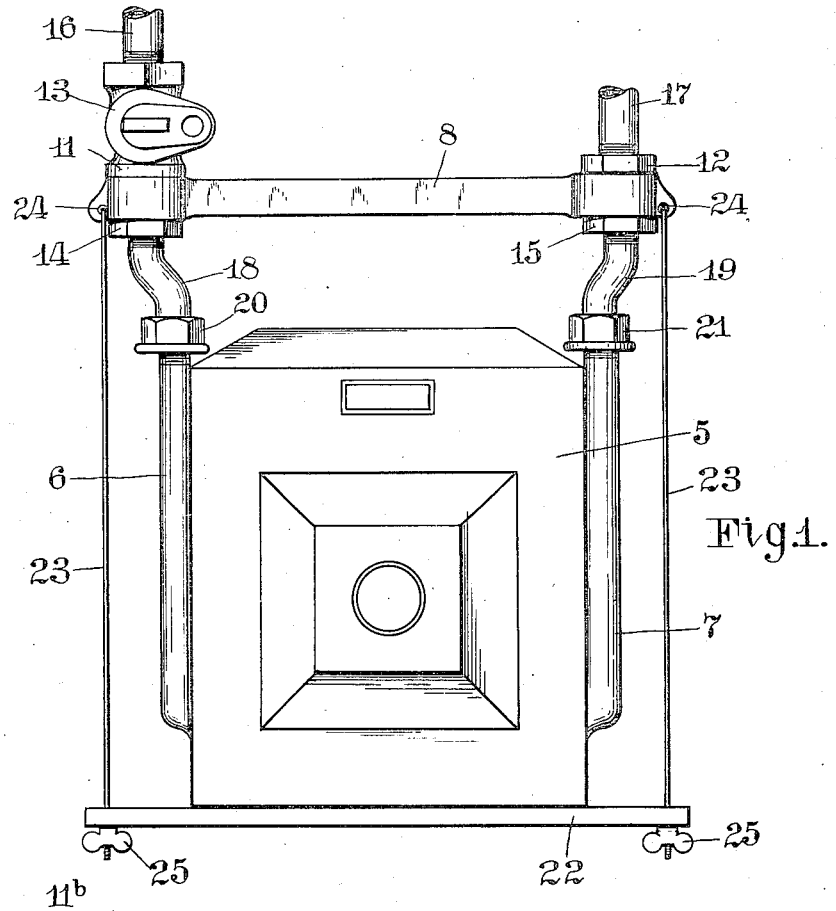
Figure 1 is a front elevation showing an ordinary house meter hung with my invention.
Figure 2:
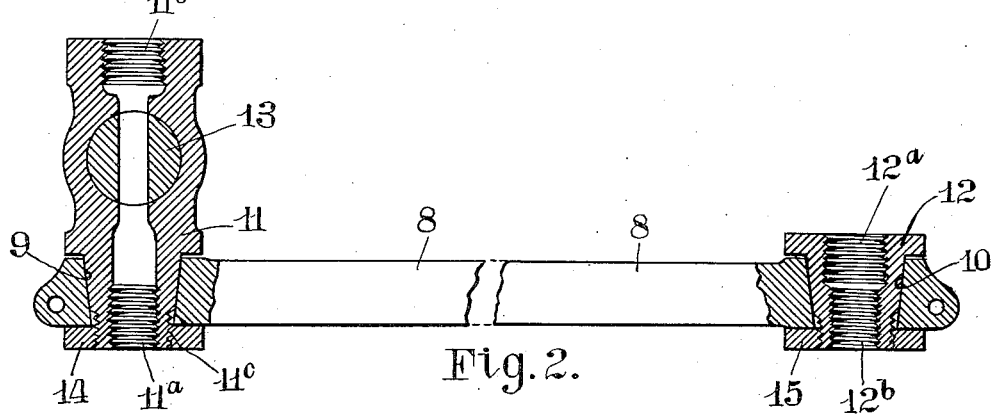
Fig. 2 is a detail on a larger scale showing the connecting bar broken out and with the ends of the bar and the inlet and outlet connector pipe members in section.

In the views 5 designates the sheet metal meter referred to, it having affixed thereto by solder the inlet and outlet pipes 6 and 7 respectively each of which is threaded at its upper end. The connector bar, designated 8, can be of any stiff metal preferably of cast iron or steel.

The opposite ends of said bar 8 are each made with downwardly tapering through holes 9 and 10 respectively to receive chambered or sleeve members 11 and 12 respectively, the latter having externally tapered portions like the tapered holes 9 and 10.

The chambered member 11 can be provided with a stop cock 13 and internal threads 11a and 11b. The upper end of the chambered member 11 is formed to receive a wrench for turning it. The lower end of said chambered member projects beyond the lower side of the bar 8 where it is provided with an external thread 11c to receive a nut 14 adapted to be turned with a wrench to secure the chambered member in the connecting bar.

The chambered member 12 has an internal thread 12a in its upper portion and an internal thread 12b in its lower portion; and the lower end of said chambered member projects beyond the connector bar, said projecting end being externally threaded to receive a nut 15 adapted to be turned with a wrench to secure said chambered member to the connector bar.

The ends of the service and house pipes are indicated at 16 and 17, said ends being threaded to receive the upper internal threads of the chambered members. Such service and house pipes are seldom so positioned as not to require adjustment to put them approximately in line with the pipes 6 and 7 on the meter.

In practice with the present invention the sleeve or chambered members 11 and 12 are first by themselves turned onto the respective pipes 16 and 17, after which the connector bar 8 is shifted to and fitted at its conical holes on the respective tapered portions of said chambered members, the service and house pipes 16 and 17 being forced laterally into position to permit this.

The tapered character of the holes and chambered members facilitates the application of the bar to the chambered members. In addition to facilitating the application of the conical socket of the bar to the sleeve, the inclined surfaces of the conical hole and the conical sleeve cooperate to cause the proper centering after partial insertion of the sleeve in the bar.

The nuts 14 and 15 are then applied to secure the fixed relation of the pipes 16 and 17 and the chambered members effected by the intervention of the rigid or stiff bar 8.

The rigid bar establishes the fixed relation of the service or house pipes, and to provide for lack of uniformity in the spacing of the meter pipes 6 and 7, there is interposed between the lower ends of the sleeves or chambered members short pieces of bent pipe or coupling nipples 18 and 19, the lower ends of said bent pipes being adjustable to align them with the threaded ends of the meter pipes 6 and 7 to which they can be connected by ordinary unions, as shown at 20 and 21.

From this construction it will be observed that no lateral strain whatever is or can be exerted on the meter pipes 6 and 7 by reason of any primary misalinement of the service and house pipes.

The weight of the meter is borne by a shelf bar 22 supported by wire rods 23 threaded at their lower ends and connected with eyes 24 at their upper ends on the chambered sections, thumb nuts 25 being employed to press said shelf bar sufficiently upward to take such weight.

The forms and proportions of the parts can be changed without departing from the gist of the invention as claimed.

What I claim is:

1. Means for spacing the two service pipes of a meter comprising a rigid one-piece bar having at one end thereof means for engaging one of the service pipes and having at the other end thereof a conical opening forming a seat, a conical sleeve to fit in said seat and rotatably mounted therein, said sleeve having a screw thread in its larger end for connection with the other service pipe and a screw thread for connection with the meter pipe.

2. Means for spacing the two service pipes of a meter comprising a rigid one-piece bar having at one end thereof means for engaging one of the service pipes and having at the other end thereof a conical opening forming a seat, a conical sleeve to fit in said seat and rotatably mounted therein, said sleeve having a screw thread in its larger end for connection with the other service pipe and a screw thread for connection with the meter pipe, and an externally threaded portion on the smaller end of said sleeve, and a nut thereon to draw the bar and conical sleeve together.

3. In a meter connection the combination of a rigid bar adapted to extend substantially horizontally and provided at the ends thereof with taper sockets extending therethrough, a pair of tapered sleeve members having at the upper ends thereof means whereby said sleeves may be turned, and internal screw threads whereby they may be connected to the lower ends of a pair of vertical gas pipes, said members being insertable into said sockets while in connected relation with the pipes by shifting the bar upwardly towards the pipes, and shaped to rotatably fit in said taper sockets, nuts mounted on the lower ends of the members for holding said members against vertical displacement with respect to the bar after insertion into the sockets, and coupling nipples connected to and depending from said lower ends of the sleeve members and provided with means at the lower ends thereof for connection to the tubes of the meter.

4. A connection for holding in spaced relation the tubes of a gas meter, comprising in combination a rigid bar adapted to extend substantially horizontally and provided at one end thereof with a vertical circular socket extending therethrough and at its other end with means adapted for connection to a pipe, a coupling nipple for connection to one of the tubes of the gas meter connected to and depending from the means and adapted to communicate with the pipe through said means, a vertical sleeve-member fitting accurately the socket and held by the socket-forming portion of the bar so that it is rotatable on a fixed vertical axis, the upper end of said sleeve-member being extended and shaped to form an integral valve casing for connection to a second pipe, a valve plug mounted in the casing, and a coupling nipple for connection to the other meter tube connected to and depending from the lower end of the sleeve-member and adapted to communicate with said second pipe through the member and valve casing.

5. A connection for holding in spaced relation the tubes of a gas meter, comprising in combination a rigid bar adapted to extend substantially horizontally and provided at one end thereof with a vertical circular socket extending therethrough and at its other end with means adapted for connection to a pipe, a coupling nipple for connection to one of the tubes of the gas meter connected to and depending from the means and adapted to communicate with the pipe through said means, a vertical sleeve-member fitting accurately the socket and held by the socket-forming portion of the bar so that it is rotatable on a fixed vertical axis, the upper end of said sleeve-member being extended and shaped to form a valve casing integral with the sleeve member for connection to a second pipe, a valve plug mounted in the casing, and a coupling nipple for connection to the other meter tube connected to and depending from the lower end of the sleeve-member and adapted to communicate with said second pipe through the member and valve casing.

6. A connection for holding in spaced relation the tubes of a gas meter, comprising in combination a rigid bar adapted to extend substantially horizontally and provided at one end thereof with a vertical taper socket extending therethrough and at its other end with means adapted for connection to a pipe, a coupling nipple for connection to one of the tubes of the gas meter connected to and depending from the means and adapted to communicate with the pipe through said means, a vertical taper sleeve-member fitting accurately the socket and held by the socket-forming portion of the bar so that it is rotatable on a fixed vertical axis, the upper end of said sleeve member being extended and shaped to form a valve casing integral with the sleeve member for connection to a second pipe, a valve plug mounted in the casing, and a coupling nipple for connection to the other meter tube connected to and depending from the lower end of the sleeve-member and adapted to communicate with said second pipe through the member and valve casing.

7. A connection for holding in spaced relation the tubes of a gas meter, comprising in combination a rigid bar adapted to extend substantially horizontally and provided at the ends thereof with vertical sockets extending therethrough, a pair of vertical sleeve-members embodying at the upper ends thereof polygonal shoulders for turning purposes and internal screw threads whereby they may be connected to the lower ends of a pair of vertical gas pipes, said members being insertable into the sockets while in connected relation with pipes by shifting the bar upwardly towards the pipes, and shaped to fit accurately and rotatably in the sockets, nuts mounted on the lower ends of the members for holding said members against vertical and rotative displacement with respect to the bar after insertion into the sockets, and coupling nipples connected to and depending from the said lower ends of the sleeve-members and provided with means at the lower ends thereof for connection to the tubes of the meter.

CHARLES W. STEVENS.